United States Patent [19]
Brackett et al.

[11] Patent Number: 5,550,818
[45] Date of Patent: Aug. 27, 1996

[54] SYSTEM FOR WAVELENGTH DIVISION MULTIPLEXING/ASYNCHRONOUS TRANSFER MODE SWITCHING FOR NETWORK COMMUNICATION

[75] Inventors: Charles A. Brackett, Mendham; Gee-Kung Chang, Holmdel; Muhammed Z. Iqbal, Tinton Falls, all of N.J.

[73] Assignee: Bell Communications Research, Inc., Morristown, N.J.

[21] Appl. No.: 308,313

[22] Filed: Sep. 19, 1994

[51] Int. Cl.$^6$ .......................... H04J 14/02; H04L 12/433
[52] U.S. Cl. .................... 370/60; 370/85.12; 370/85.14; 359/123; 359/124; 359/139; 359/341
[58] Field of Search .................................. 359/124, 139, 359/118, 123, 127, 137; 370/85.14, 60.1, 85.5, 85.11, 85.15, 110.1, 85.12

[56] References Cited

U.S. PATENT DOCUMENTS

| | | | |
|---|---|---|---|
| 4,734,907 | 3/1988 | Turner | 370/60 |
| 4,821,255 | 4/1989 | Kobinski | 359/128 |
| 4,829,227 | 5/1989 | Turner | 370/60 |
| 4,849,968 | 7/1989 | Turner | 370/60 |
| 4,901,309 | 2/1990 | Turner | 370/60 |
| 5,077,727 | 12/1991 | Suzuki | 359/123 |
| 5,111,323 | 5/1992 | Tanaka et al. | 359/139 |
| 5,175,777 | 12/1992 | Bottle | 385/17 |
| 5,179,551 | 1/1993 | Turner | 370/60 |
| 5,179,556 | 1/1993 | Turner | 370/94.1 |
| 5,214,527 | 5/1993 | Chang et al. | 359/189 |
| 5,229,991 | 7/1993 | Turner | 370/60 |
| 5,260,935 | 11/1993 | Turner | 370/60 |
| 5,303,078 | 4/1994 | Brackett et al. | 359/139 |
| 5,369,516 | 11/1994 | Uchida | 359/125 |
| 5,392,154 | 2/1995 | Chang et al. | 359/341 |
| 5,452,115 | 9/1995 | Tomioka | 359/123 |

OTHER PUBLICATIONS

Brackett, *Photonics in Switching*, "Multiwavelength Switching and Interconnection Networks," vol. II, 1993.
Lawton, *Lightwave*, "DARPA builds optical switch," pp. 1, 16, 18, 20, May 1993.
A Scalable Multiwavelength Multihop Optical Network: A Proposal for Research on All-Optical Networks, *Journal of Lightwave Technology*, May/Jun. 1993, vol. 11, pp. 736–753.

*Primary Examiner*—Melvin Marcelo
*Assistant Examiner*—Melissa Kay Carman
*Attorney, Agent, or Firm*—Leonard Charles Suchyta; James W. Falk

[57] ABSTRACT

The present invention is directed to a system for the wavelength division multiplexing/asynchronous transfer mode (WDM/ATM) operation of high-capacity optical communication networks. The optical components of the network can transport vast amounts of information, while the ATM-based electronics provides data processing, and information distribution. The capacity of the communications network to reconfigure and rearrange itself is maximized through wavelength translation of its data signals using a limited set of fixed-wavelength channels. The system incorporates an optical fiber communication network ring, or several optical fiber communication network rings that are connected to each other, through which data signals are transmitted and received. Optical WDM cross-connecting switch devices 4a–4e connect adjacent optical fiber rings 3a, 3b to each other, and control the routing of the data signals into and out of the optical fiber rings 3a, 3b. Access node circuits 2a–2d connected to the WDM cross-connecting switch devices 4a–4d can access the data signals in the optical fiber rings 3a, 3b. Each of the access node circuits 2a–2d can then route the data signals to individual user stations 5a–5h connected to it. A network controller 8 configures the WDM cross-connecting switch devices 4a–4e through their corresponding local node controllers 7.

22 Claims, 11 Drawing Sheets

TRANSMITTING

|  | 2a | 2b | 2c | 2d |
|---|---|---|---|---|
| 2a | $\lambda_1$ | $\lambda_2\ \lambda_3$ | * | $\lambda_4$ |
| 2b | $\lambda_2$ | $\lambda_4$ | $\lambda_1$ | $\lambda_3$ |
| 2c | $\lambda_3$ | $\lambda_1$ | $\lambda_3$ | $\lambda_2$ |
| 2d | $\lambda_4$ | * | $\lambda_3\ \lambda_2$ | $\lambda_1$ |

RECEIVING

FIG. 4A

CROSS-CONNECT MODULE

| SWITCH & WAVELENGTH | 4a | 4b | 4c | 4d | 4e |
|---|---|---|---|---|---|
| 10a $\lambda_1$ | 0 | 1 | 1 | 0 | 1 |
| 10b $\lambda_2$ | 1 | 1 | 1 | 1 | 0 |
| 10c $\lambda_3$ | 1 | 1 | 1 | 1 | 1 |
| 10d $\lambda_4$ | 1 | 0 | 0 | 1 | 1 |

FIG. 4B

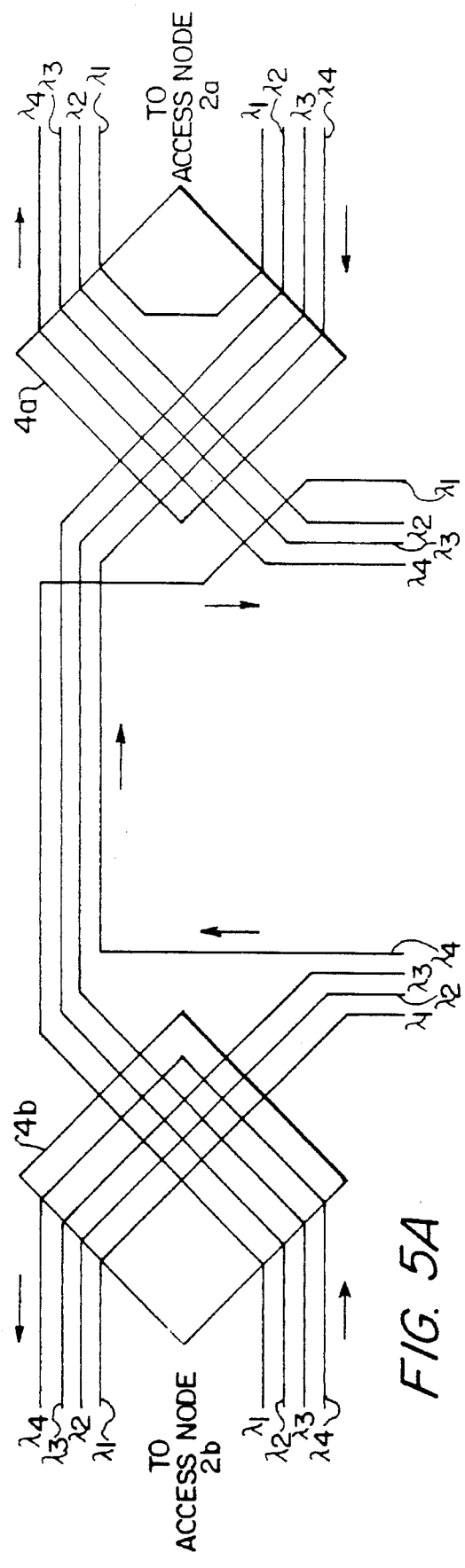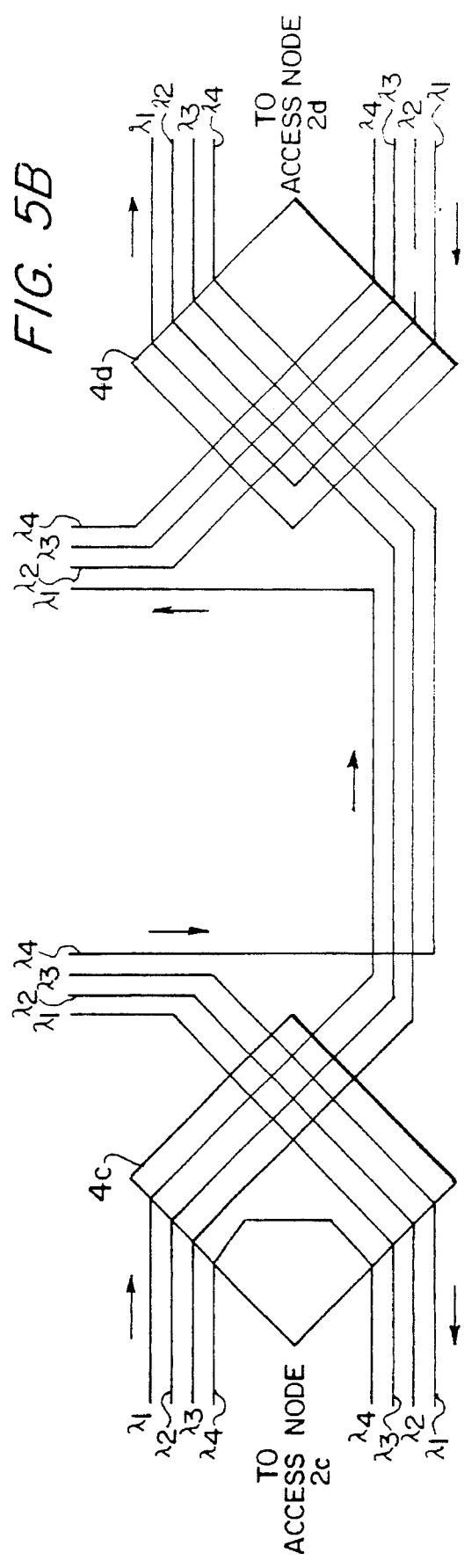

TRANSMITTING

|  | 2a | 2b | 2c | 2d |
|---|---|---|---|---|
| 2a | $\lambda_1$ | $\lambda_2$ | $\lambda_4$ | * |
| 2b | $\lambda_2$ | $\lambda_4$ | $\lambda_1$ | $\lambda_3$ |
| 2c | $\lambda_4$ | $\lambda_1$ | $\lambda_3$ | $\lambda_2$ |
| 2d | * | $\lambda_3$ | $\lambda_2$ | $\lambda_4$ |

RECEIVING

*FIG. 6A*

CROSS-CONNECT SWITCH NO.

| WAVELENGTH | 4a | 4b | 4c | 4d | 4e |
|---|---|---|---|---|---|
| 1 | 0 | 1 | 1 | 0 | 1 |
| 2 | 1 | 1 | 1 | 1 | 0 |
| 3 | 0 | 1 | 0 | 1 | 1 |
| 4 | 1 | 0 | 1 | 0 | 1 |

*FIG. 6B*

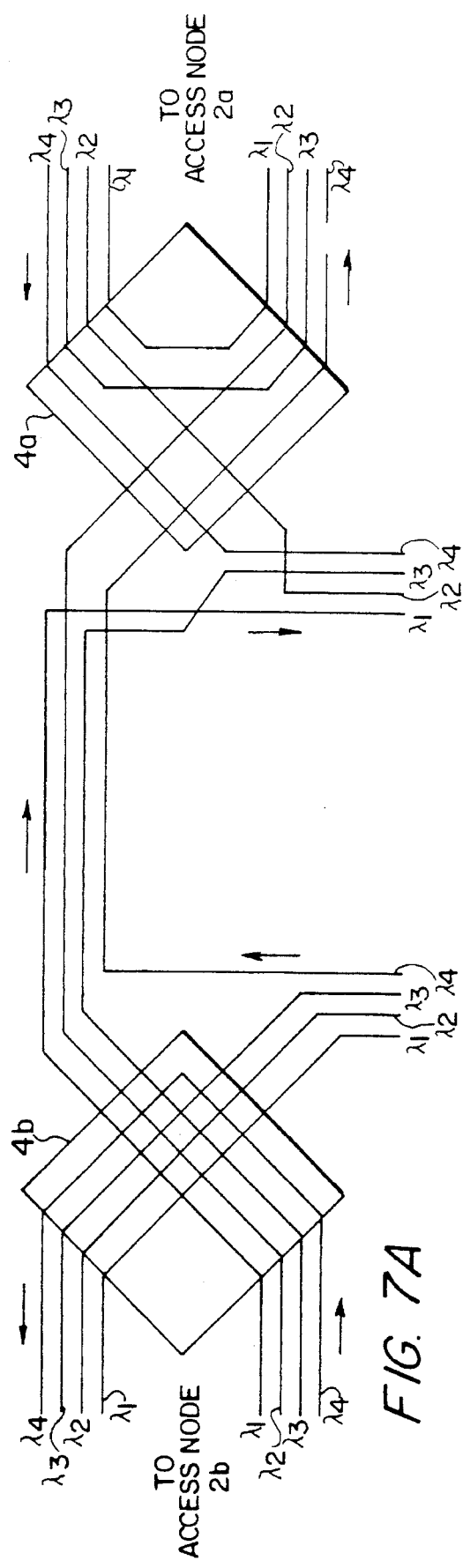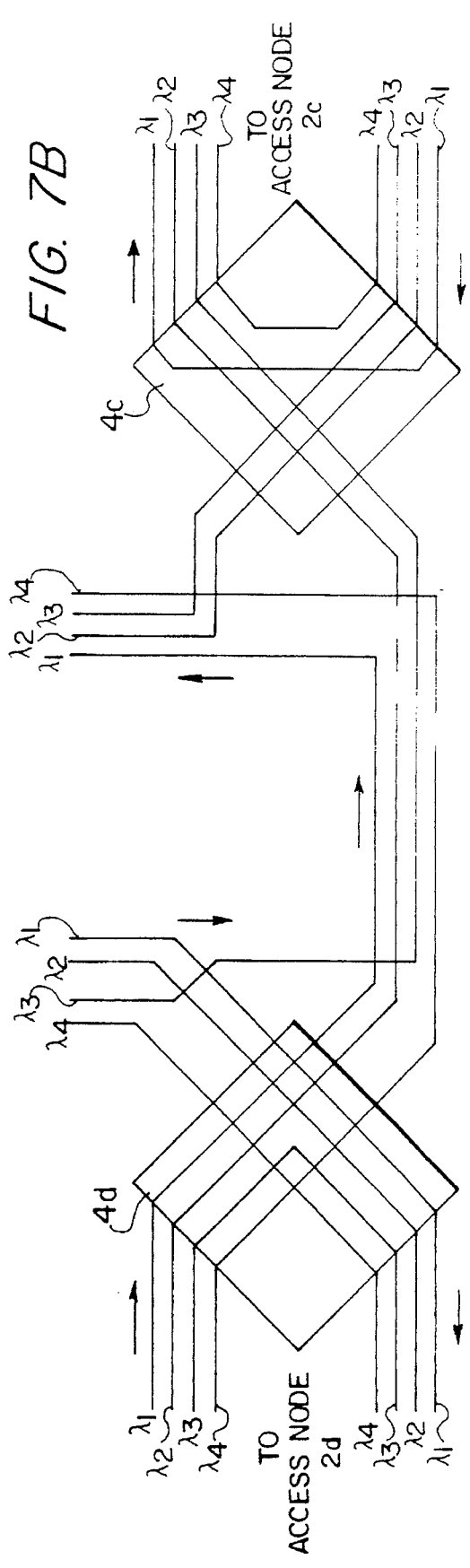

5,550,818

SYSTEM FOR WAVELENGTH DIVISION MULTIPLEXING/ASYNCHRONOUS TRANSFER MODE SWITCHING FOR NETWORK COMMUNICATION

GOVERNMENT RIGHTS

The invention was made with government support under Agreement No. MDA972-92-H-0010 awarded by DARPA. The government has certain rights in the invention.

BACKGROUND OF THE INVENTION

1. Field of the Invention

The invention relates to a system for controlling the operation of high capacity communication networks that use fiber optic technology. Specifically, the invention relates to controlling the routing of data signals to a large number of users at different wavelengths using wavelength-selection, space-division optical cross-connecting switch devices, and asynchronous transfer mode (ATM) switches.

2. Related Art

High-speed, high-capacity optical communication systems are being developed. U.S. high-technology companies are developing the "Information Super Highway." This "Information Super Highway" is envisioned to be a communication system that adapts various types of user data services. For example, the system is designed to accommodate different types of data including voice, data, still-image, and live-video/voice multicast transmissions to a large number of users. The system may send the data in "burst" transmissions between individual users and/or between regions. Individual users may access the system through a local area network using desktop computers. Different regions of the country may access the system through wide area networks.

In the "Super Highway" or in any future network, user traffic patterns will likely evolve and usage is expected to rapidly increase along with more complex services. As the "Super Highway" or network expands, the system's ability to adapt to the expansion may be severely taxed. In other words, problems may occur if the "Super Highway" or network is unable to adapt to the changing traffic patterns without degrading its service to its current users.

The challenge facing the telecommunications industry is designing a network that can allocate and manage a growing data transmission capacity that is capable of incorporating new users and new equipment while serving its current users. The industry also faces the challenge of designing the network to be capable of reconfiguring itself for an optimum level of efficiency. To meet the operating requirements for various types of data communication, the "Information Super Highway" and any similar future networks must be designed to reconfigure themselves relatively quickly and efficiently.

SUMMARY OF THE INVENTION

A main object of the present invention is to provide a system for high-capacity optical communication networks that can transport vast amounts of information, while providing efficient data processing and information distribution.

Another object of the present invention is to maximize the capacity of a communications network to reconfigure and rearrange itself where the network uses wavelength translation of its data signals and a limited set of fixed-wavelength channels.

Consequently, a further object of the present invention is to provide a system using both wavelength division multiplexing (WDM) and asynchronous transfer mode (ATM) switching for high-capacity, optical communication networks.

In order to achieve the above objects, the present invention encompasses a system that comprises an optical fiber communication network ring, or several optical fiber communication network rings that are connected to each other, through which data signals are transmitted and received. Optical WDM cross-connecting switch devices connect adjacent optical fiber rings to each other, and control the routing of the data signals into and out of the optical fiber rings. Access node circuits connected to the WDM cross-connecting switch devices can access the data signals in the optical fiber rings. Each of the access node circuits can then route the data signals to individual user stations connected to it. A network controller configures the WDM cross-connecting switch devices through their corresponding local node controllers.

One particular feature of the invention is that each cross-connecting device incorporates 1) a demultiplexer circuit for demultiplexing the data signals into several wavelength-separated data signals, 2) a wavelength-selection, space-division switch for each of the wavelength-separated data signals, and 3) a multiplexer circuit for multiplexing the wavelength-separated data signals together into the data signals transmitted through the network. Each of the wavelength-selection, space-division switches is configured in either a BAR state or a CROSS state. The BAR state allows the switch to simply conduct its corresponding wavelength-separated data signal bypassing the access node circuit connected to the cross-connecting device. The CROSS state of the switch diverts the wavelength-separated data signal to the access node circuit, and allows a wavelength-separated data signal from the access node circuit to be inputted into the multiplexer.

BRIEF DESCRIPTION OF THE DRAWINGS

The invention is better understood by reading the following Detailed Description of the Preferred Embodiments with reference to the accompanying drawing figures, in which like reference numerals-refer to like elements throughout, and in which:

FIG. 4A illustrates a cross-reference chart showing example wavelength assignments for the 2×2 WDM cross-connect module of the present invention;

FIG. 4B illustrates a cross-reference chart showing example switch configurations for the wavelength-selection, space-division switches in the 2×2 WDM cross-connect modules having the wavelength assignments of FIG. 4A;

FIGS. 5A, 5B and 5C together show a graphical representation of the cross-connections outlined in the cross-reference charts from FIGS. 4A and 4B;

FIG. 6A shows a second cross-reference chart of example wavelength assignments for the 2×2 WDM cross-connect module of the present invention;

FIG. 6B shows a second cross-reference chart of example switch configurations for the wavelength-selection, space-division switches in the 2×2 WDM cross-connect modules having the wavelength assignments of FIG. 6A;

FIGS. 7A, 7B and 7C together show a graphical representation of the cross-connections outlined in the cross-reference charts from FIGS. 6A and 6B;

DETAILED DESCRIPTION OF THE PREFERRED EMBODIMENTS

Figure 1:
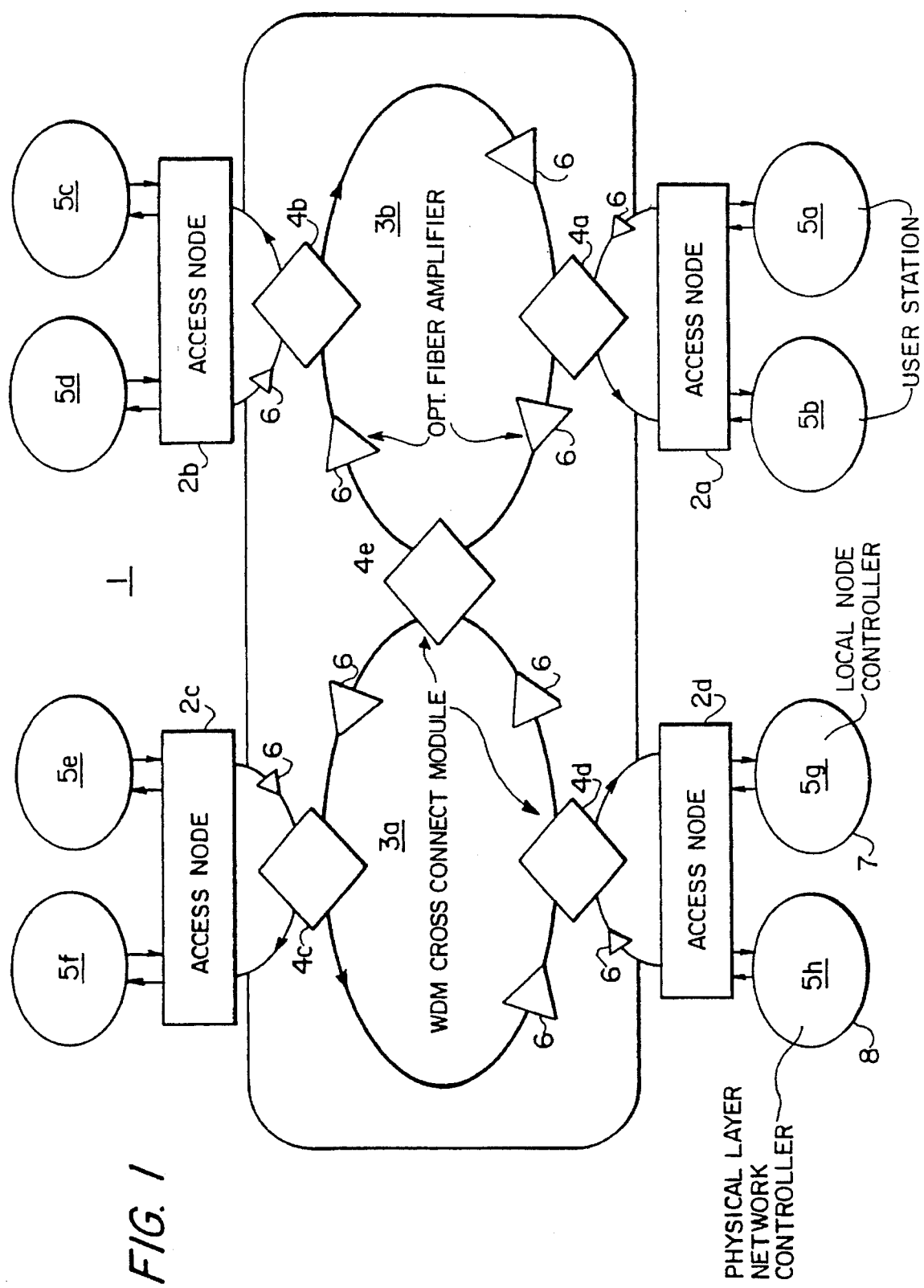
FIG. 1 illustrates a system diagram showing the general network architecture of a preferred embodiment of the present invention.

In describing preferred embodiments of the present invention illustrated in the drawings, specific terminology is used for the sake of clarity. However, the invention is not intended to be limited to the specific terminology so selected, and it is to be understood that each specific element includes all technical equivalents that operate in a similar manner to accomplish a similar purpose.

A paper by Charles A. Brackett, et al., "A Scalable Multi-wavelength Multi-hop Optical Network: A Proposal for Research on All-Optical Networks", *Journal of Lightwave Technology*, Volume 11, No. 5/6 (May/June 1993) is incorporated herein by reference. In that paper, an architectural approach for very high capacity wide area optical networks is described. That proposed architecture uses wavelength-selective, wavelength-routing, wavelength-division-multiplexing (WDM) cross-connects and multi-wavelength transceivers. The proposed architecture is scalable in the number of network users, in the geographical range of coverage, and in the aggregate network capacity it can accommodate. Scalability as defined in the Brackett et al. article is the ability of a network (e.g., a communications network) to add one or more access stations to its current number of users in order to offer service to a given population size of users spread over a given service domain.

In the proposed architecture, a user is connected to a network through an access station equipped with a limited number of optical transmitters and receivers (transceivers), each operating on a different wavelength. With that fixed set of transceivers, data communication channels are established between access stations through an optical interconnect system. This interconnect system is intended to be wavelength-selective and electronically-controllable, thereby permitting clear communication between selected access stations using a limited set of wavelengths. At the same time, the interconnect system permits that limited set of wavelengths to be re-used by the other access stations.

In one embodiment, the present invention is directed to an optical communications network that incorporates a plurality of network access nodes connected to a wavelength division multiplexing (WDM) optical fiber ring through WDM cross-connect modules.

In second, preferred embodiment, the present invention is directed to an optical communications network that incorporates a plurality of network access nodes distributed among multiple wavelength division multiplexing (WDM) optical fiber rings, and connected to their corresponding WDM optical fiber rings by WDM cross-connect modules. The optical fiber rings themselves are connected by additional WDM cross-connect modules. In both embodiments, the network access nodes each incorporate multi-wavelength transmitter arrays to communicate with the network. Signals from individual user stations connected to the access nodes enter the network using the multi-wavelength transmitter arrays. A user station connected to an access node may be, among others, an individual user terminal such as a PC, a local area network (LAN) having its own plurality of users, or even a supercomputer.

In the present invention, scalability is achieved by re-using a limited number of wavelengths to create "hand-to-hand" single-hop connections between the WDM cross-connect modules as will be explained below. Within the WDM cross-connect modules, these single hop connections are then connected using ATM switches to perform wavelength translation and buffering, thereby creating a multi-hop network. This multi-hop network provides connectivity among many users, and results in a network of very high capacity that may be reconfigured with minimum information flow interruption and maximum utilization of the network bandwidth.

One example of the implementation of the present invention is illustrated in FIG. 1. As shown, in an optical network 1, a plurality of network access nodes 2a–2d are distributed between a plurality of adjacent, interconnected WDM optical fiber rings 3a, 3b joined by at least one WDM cross-connect module 4e. In this embodiment, four access nodes and two optical fiber rings are used. The access nodes 2a–2d are then each connected to the WDM optical fiber rings 3a, 3b also through a WDM cross-connect module. In this example, with four access nodes 2a–2d, four 2×2 WDM cross-connect modules 4a–4d are employed. User stations 5a–5h are distributed among the access nodes 2a–2d and access the fiber rings 3a, 3b through the access nodes 2a–2d. Optical fiber amplifiers 6 are employed within the individual fiber rings 3a, 3b to compensate for component insertion losses and fiber transmission losses in the signals transmitted through the fiber rings 3a, 3b. A suitable optical fiber amplifier is an erbium-doped type. As shown, amplifiers 6 may be located at the outputs of the WDM cross-connect modules 4a–4e.

Figure 2A:
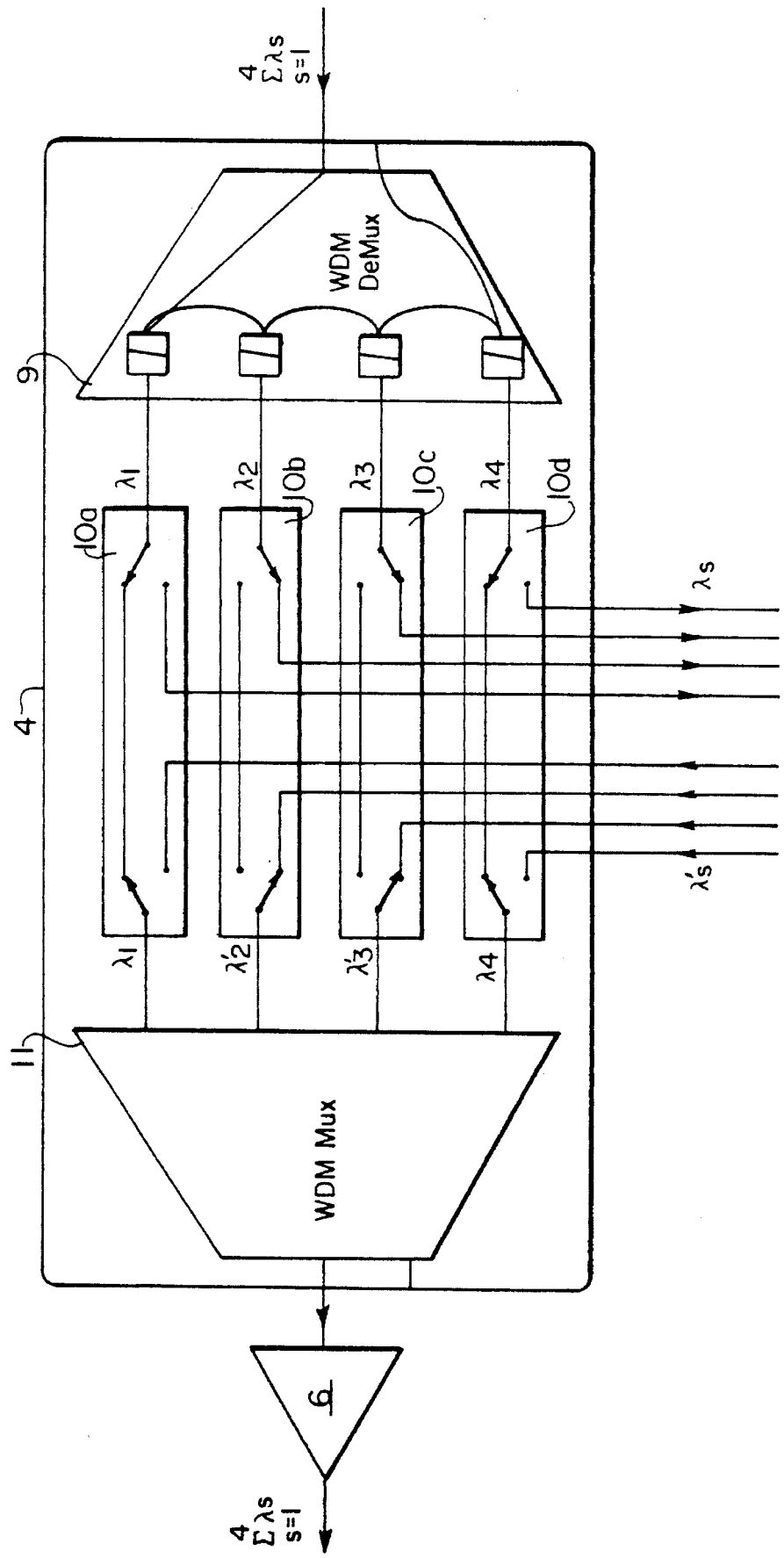
FIG. 2A shows a system diagram for a general embodiment of a 2×2 WDM cross-connect module applicable to the network architecture of the present invention.
Figure 2B:
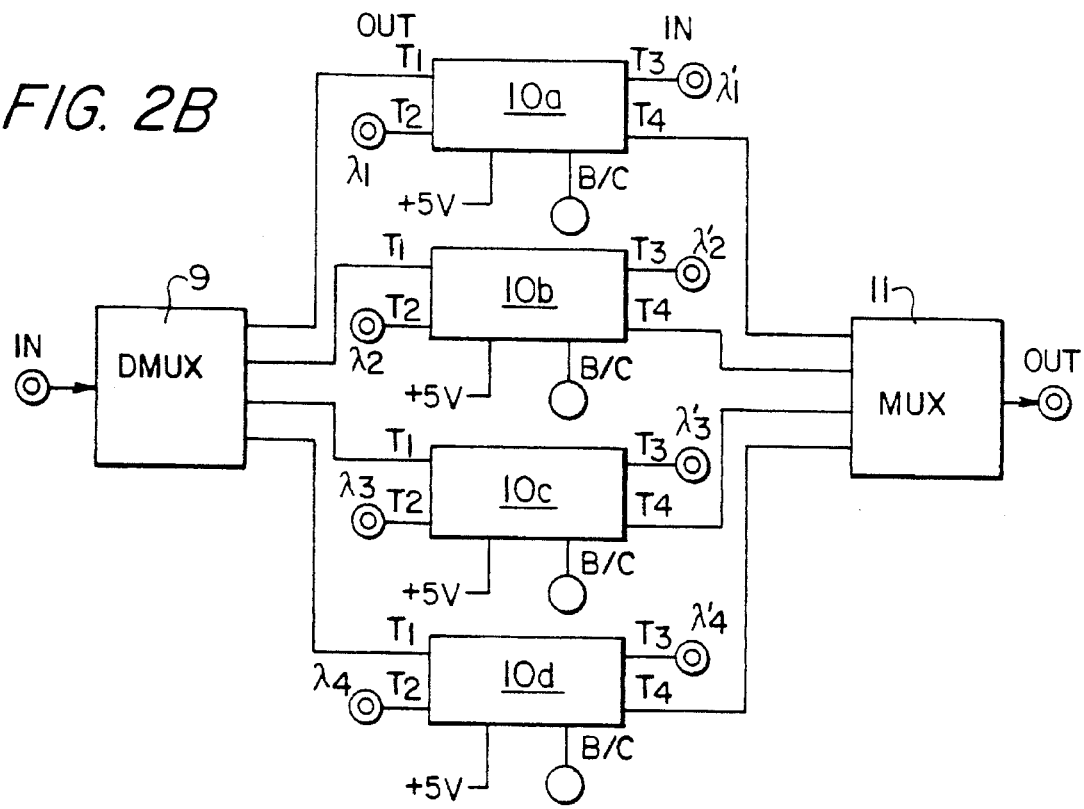
FIG. 2B illustrates the circuit structure of the 2×2 WDM cross-connect module shown in FIG. 2A.

FIGS. 2A and 2B illustrate the structure and operation of a general 2×2 embodiment of the WDM cross-connect module 4. In this general embodiment of the WDM cross-connect module, each cross-connect module 4a–4e incorporates a WDM demultiplexer 9, a plurality of 2×2 wavelength-selection, space-division switches 10a–10d, and a WDM multiplexer 11. An optical fiber amplifier 6 may be connected to the output of each WDM cross-connect module to amplify the multiplexed signals for transmission through the optical fiber rings 3a, 3b as shown in FIG. 1.

Up to four separate wavelengths can be multiplexed and transmitted through the WDM cross-connect modules 4a–4d. In operation, the WDM multiplexed input signals $\Sigma\lambda_s$ are first inputted into the demultiplexer 9 to separate the multiplexed input signals $\Sigma\lambda_s$ into four parallel input signals in different wavelengths $\lambda_1, \lambda_2, \lambda_3, \lambda_4$. The four parallel input signals $\lambda_1, \lambda_2, \lambda_3, \lambda_4$ are then inputted into corresponding wavelength-selection, space-division switches 10a–10d. Each of the wavelength-selection, space-division switches 10a–10d as configured by the WDM cross-connect module's local controller 7 either routes selected wavelengths to bypass a corresponding access node 2a–2d or routes the selected wavelengths to be diverted to the corresponding access node. In the WDM cross-connect module illustrated in FIG 2A, the input signals $\lambda_1$ and $\lambda_4$ are routed to bypass the corresponding access node through the WDM cross-connect module, while the input signals $\lambda_2$, $\lambda_3$ are diverted to the access node for processing by an ATM switch in the access node. For example, the input signals may be sent to designated user stations 5a–5h which may be connected to that access node, or bypass through as being designated for other access nodes in the network.

The input signals $\lambda_1$ and $\lambda_4$ as illustrated in FIG. 2A pass through the WDM cross-connect module, but may be diverted in another WDM cross-connect module configured to route those input signals to the ATM switch in its access node. This is an example of a multi-hop connection, or of a local train information carrier in operation, both of which will be explained below.

Signals from the user stations $\lambda'_s$ connected to the ATM switch of the access node connected to the WDM cross-connect module shown in FIG. 2A can also be routed by the ATM switch into the wavelength-selection, space-division switches 10a–10d corresponding to their selected wavelengths In this case, the signals $\lambda'_2$ and $\lambda'_3$ are routed into the switches that correspond to their wavelengths Four parallel output signals $\lambda'_1$, $\lambda'_2$, $\lambda'_3$, $\lambda'_4$ are then be multiplexed together as $\Sigma\lambda'_s$ and outputted from the WDM cross-connect module to the fiber rings 3a, 3b.

An example of how the WDM cross-connect modules 4a–4e may be constructed is shown in FIG. 2B. As shown, the multiplexed input signals are inputted into the WDM cross-connect module through a FC/PC optical fiber bulkhead connector into the demultiplexer 9 (JDS Fitel Product No. WD5555XGKC2 thin-film demultiplexer) for separation into the four parallel input signals $\lambda_1$, $\lambda_2$, $\lambda_3$, $\lambda_4$. The input signals are then inputted into the wavelength-selection, space-division switches 10a–10d which consist of JDS Fitel Product No. SR22A400FP discrete wavelength-selection, space-division switches Output signals $\lambda'_1$, $\lambda'_2$, $\lambda'_3$, $\lambda'_4$ from the discrete switches are multiplexed by the multiplexer 11 (JDS Product No. WD5555YGKC2 thin-film multiplexer) into the multiplexed output signals In operation, each of the discrete wavelength-selection, space-division switches 10a–10d is configured to operate in either a BAR state or a CROSS state. In the BAR state, an input signal $\lambda_n$ is inputted into terminal T1 and outputted from terminal T2 to the access node of the WDM cross-connect module An output signal $\lambda'_n$ from the access node is routed into terminal T3 and out through terminal T4 to the multiplexer. In the CROSS state, an input signal $\lambda_n$ is inputted into terminal T1 and outputted from terminal T4 as an output signal $\lambda'_n$ to the multiplexer The BAR or CROSS state of each of the discrete switches 10a–10d is determined by the input of an external signal (eg.,0 to 5 volts) to the terminal B/C. The local node controller 7 of the WDM cross-connect module incorporating the discrete switches 10–10d sets the state of the terminal B/C based on the commands from the network controller 8 interpreting the preselected routing tables. Table 1 below shown lists the operating characteristics of an example 2×2 WDM cross-connect module constructed from the above-described components. As shown, the wavelength-selective

TABLE I

| Wavelength Channels | $\lambda_1$ = 1546 nm |
| | $\lambda_2$ = 1550 nm |

TABLE I-continued

| | $\lambda_3$ = 1554 nm |
| | $\lambda_4$ = 1558 nm |
| I/O Fiber Type | C -SMF |
| Fiber Connector Type | FC -PC |
| Output Channel Passband | 1.0 nm (±0.1 dB) |
| | 2.0 nm (±1.0 dB) |
| Optical Crosstalk Between Channels at the Center of Adjacent Channels | −30 dB (max) |
| Output Channel Intensity Variation | 0.5 dB (max) |
| Insertion Loss (fiber to fiber) | 4.0 dB |
| Reflection Tapping Port Eff. | 10% |
| Polarization Sensitivity | 0.1 dB |
| Temperature Sensitivity | 0.025 nm/°C. | selective and wavelength routing functions of the discrete switches have set the center wavelengths to be within ±0.1 nm of 1546, 1550, 1554 and 1558 nm. Among other features, the crosstalk between channels was measured to be −30 dB maximum. The switch's temperature sensitivity was measured to be 0.025 nm/° C. The maximum fiber-to-fiber insertion loss was 4.0 dB.

Figure 3:
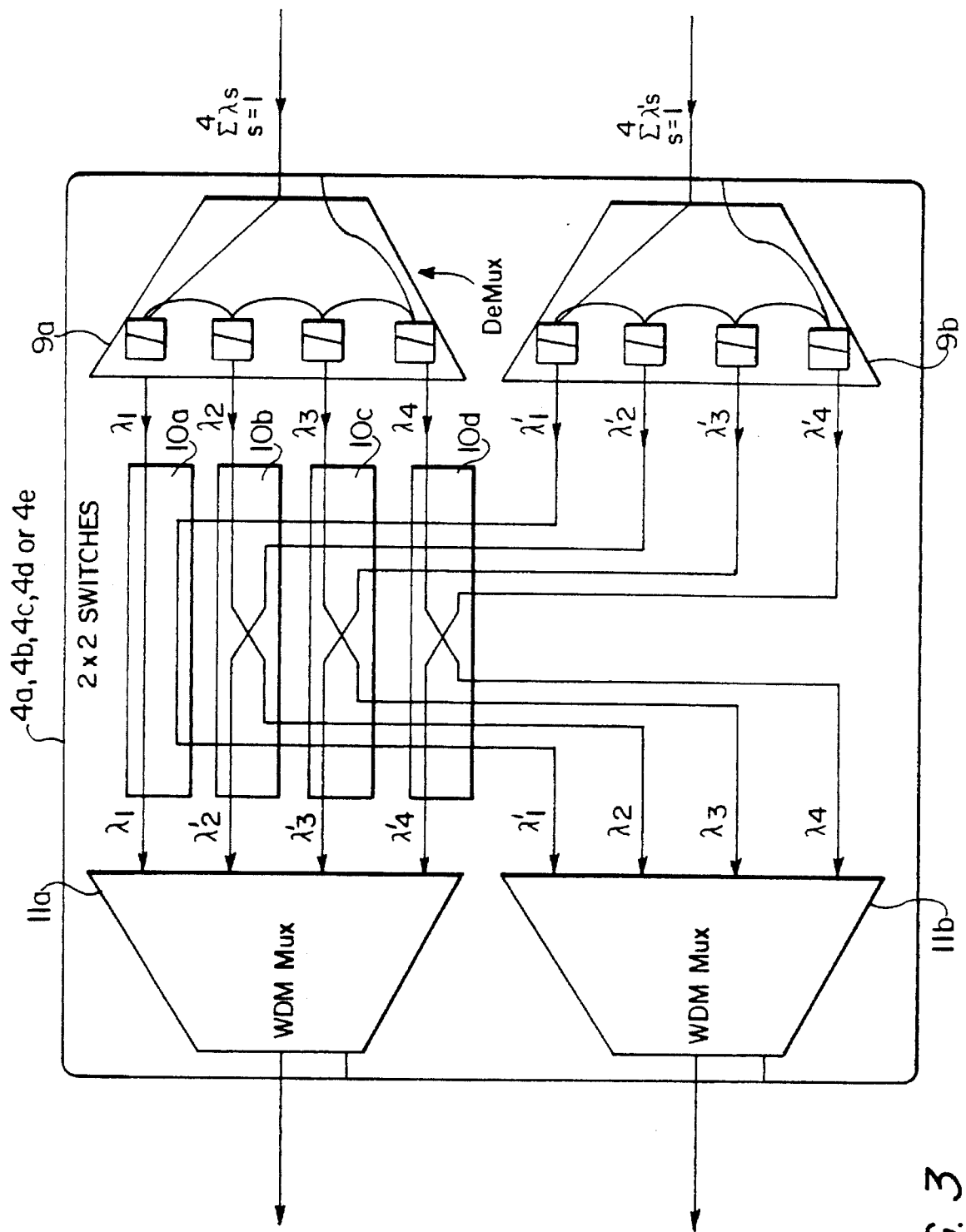
FIG. 3 shows a system diagram of a specific embodiment of the 2×2 cross-connect module incorporated into the network architecture of the present invention shown in FIG. 1.

In the general embodiment of the present invention discussed above, FIG. 2A illustrates the input signals $\lambda_1$, $\lambda_2$, $\lambda_3$, $\lambda_4$ being transmitted to the access node in parallel. As shown in FIGS. 1 and 3, the input signals may alternatively be transmitted to the access node in a multiplexed form. In FIG. 3, a specific embodiment of the present invention comprises a WDM cross-connect module 4a–4e having parallel-connected demultiplexers and multiplexers. Each cross-connect module 4a–4e incorporates WDM demultiplexers 9a, 9b, the 2×2 wavelength-selection, space-division switches 10a–10d, and WDM multiplexers 11a, 11b.

In this specific embodiment, four separate wavelengths also may be multiplexed and transmitted through the WDM cross-connect modules 4a–4e. In operation, the WDM multiplexed input signals $\Sigma\lambda_s$ are first inputted into the first demultiplexer 9a to separate the multiplexed input signals $\Sigma\lambda_s$ into four parallel input signals $\lambda_1$, $\lambda_2$, $\lambda_3$, $\lambda_4$ in different wavelengths. The four parallel input signals $\lambda_1$, $\lambda_2$, $\lambda_3$, $\lambda_4$ are then inputted into a corresponding wavelength-selection, space-division switch 10a–10d. Each of the wavelength-selection, space-division switches 10a–10d as configured by the WDM cross-connect module's local node controller 7 either bypasses selected wavelengths through, or diverts the selected wavelengths to the second multiplexer 11b. The second multiplexer 11b then multiplexes the input signals for transmission to the ATM switches of the corresponding access node 2a–2d. In the WDM cross-connect module illustrated in FIG. 3, the input signal $\lambda_1$ is routed to bypass through the WDM cross-connect module, while the input signals $\lambda_2$, $\lambda_3$, and $\lambda_4$ are diverted to the second multiplexer 11b for transmission to the corresponding access node and then for processing by the ATM switch. As an example, the input signals may be sent to their designated user stations 5a–5h which may be connected to that access node, or bypass through for routing to a different access node. Multiplexed signals from the user stations $\lambda'_s$ connected to the access node of the WDM cross-connect module may also be routed by the ATM switch into the second demultiplexer 9b to the wavelength-selection, space-division switches 10a–10d corresponding to their selected wavelengths. The parallel output signals $\lambda'_2$, $\lambda'_3$, $\lambda'_4$ are then multiplexed together along with the signal $\lambda_1$ through the first multiplexer and outputted from the WDM cross-connect module to the fiber rings 3a, 3b.

The structure of the WDM cross-connect module illustrated in FIG. 3 is also applicable to the WDM cross-connect module 4e that is used to interconnect the optical fiber rings 3a, 3b. Like the other WDM cross-connect modules, the configuration of the module 4e is determined by which wavelengths need to be passed through to remain within the same fiber ring and which wavelengths should be diverted to the other connecting optical fiber ring. Examples of configurations for passing specific wavelengths originating from one optical fiber ring to the other interconnecting fiber ring will be set forth below.

The setting up or configuration of the WDM cross-connect modules is controlled by predetermined routing tables that designate the wavelength distribution and allocation of the WDM cross-connect modules. In the field of optical communication systems, the rule of connectivity for wavelength-division-multiplexing states that in any optical path, each wavelength carries a data stream originated from only a single source. In implementing this general rule, the following predetermined routing rules are translated into the routing tables:

1. The number of single-hop connections is maximized.
2. Single-hop connections are implemented for the longest loop paths.
3. One wavelength channel is assigned as the multi-hop, local train information carrier.

All three of the above rules are not necessarily applied simultaneously. Rather, Rule No. 1 and Rule No. 3 are applied together so that the configuration of the cross-connect modules will maximize data flow or bandwidth usage in and out of each cross-connect module, while maintaining the capability of adding new users anywhere in the network without interrupting the established connections of current users.

Rule No. 2 is only applied in configuring the cross-connect modules when users require a clear channel (single-hop) connection to deliver data with maximum security and minimum system delay or latency. Such requirements are satisfied by using a long optical path.

All three rules can only be satisfied simultaneously when a sufficiently large number of wavelength channels is available to connect all the nodes together in a system. However, in any system using a limited number of wavelengths, such connections are extremely difficult to implement.

FIG. 4A shows an example routing table of the wavelength assignments for the optical connections, and FIG. 4B is an example routing table listing the corresponding wavelength-selection, space-division switch settings for FIG. 4A to control each wavelength transmitted through the 2×2 WDM cross-connect modules 4a–4d. In FIG. 4A, the access nodes identified horizontally across the top of the table designate the transmitting access nodes, while those along the left vertical side designate the receiving access nodes. The values in the table itself designate the signal representative of a specific wavelength that a transmitting access node uses to connect with a particular receiving access node. For example, access node 2a uses $\lambda_1$ to transmit back into itself, and $\lambda_2$ to transmit to access node 2b. Also, access node 2a uses $\lambda_3$ to transmit to access node 2c, and $\lambda_4$ to transmit to access node 2d. Transmissions from one access node to another can even be through more than one input signal. For example, access node 2b can transmit to access node 2a via $\lambda_2$ or $\lambda_3$. Transmission from, for example, access node 2b to access node 2d directly requires a multi-hop connection (as denoted by "*").

In FIG. 4B, the WDM cross-connect modules 4a–4e designated horizontally across the top of the table are cross-referenced with the wavelength signals $\lambda_1$–$\lambda_4$. The wavelength signals $\lambda_1$–$\lambda_4$ correspond to the wavelength-selection, space-division switches 10a–10d, respectively. The values in the table represent the state of the corresponding wavelength-selection, space-division switches as being either a BAR state "0" or a CROSS state "1" as defined above. For example, in the WDM cross-connect module 4a, the wavelength-selection, space-division switch 10a operating with wavelength signal $\lambda_1$ is in a BAR state, while the wavelength-selection, space-division switch 10b operating with wavelength signal $\lambda_2$ is in a CROSS state.

Figure 5C:
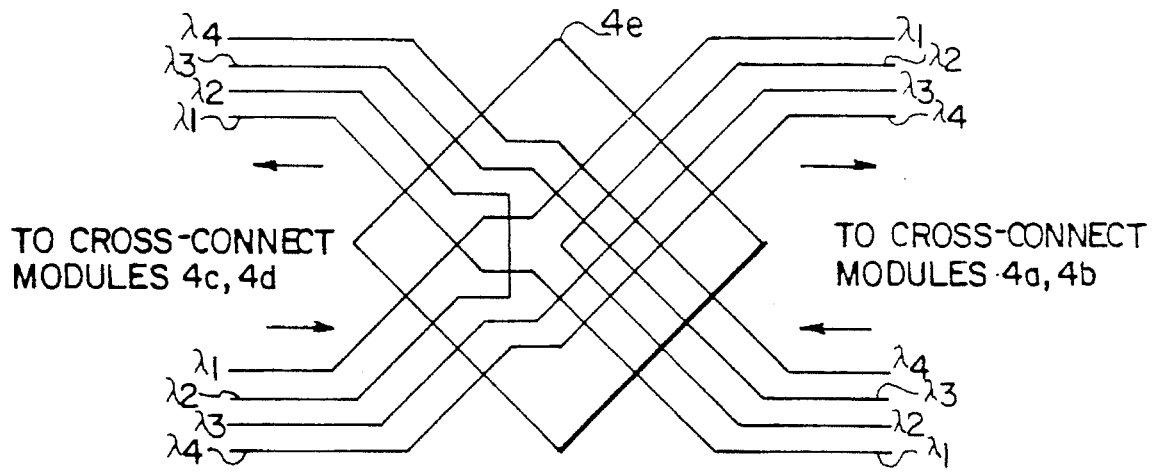

FIGS. 5A–5C illustrate how data signals are transmitted using the cross-connections outlined in FIGS. 4A and 4B by representing each of the different wavelengths as individual circuit paths. In particular, FIG. 5A shows the circuit paths for data signals at the different wavelengths routed through cross-connect modules 4a and 4b, while FIG. 5C shows the circuit paths for data signals routed through cross-connect modules 4c and 4d. FIG. 5B shows circuit paths for data signals routed through cross-connect module 4e that connect the optical fiber rings 3a, 3b.

As shown in FIG. 5A–5C, if a limited number of wavelengths are used (in this case, four), users operating through the access nodes 2a–2d cannot be fully connected by single-hop optical paths, as discussed above. Rather, multi-hop paths are needed to establish connections among all of the users. As indicated in FIG. 4A, two multi-hop connections (marked with "*") are necessary for the operation of the system.

In FIG. 4B, input signals transmitted as $\lambda_3$ are diverted (CROSS state "1" at all the access nodes 2a–2d. This means that data sent via $\lambda_3$ will travel through the entire network to each of the access nodes. In this example, the configuration using $\lambda_3$ operates as a multi-hop, local train information carrier for the network. This local train information carrier is used by access node 2b for its multi-hop connection with access node 2d, where data from access node 2b meant for access node 2d would first be diverted at access node 2a and then 2c before reaching access node 2d. The multi-hop connection between access nodes 2c and 2a follows a similar operation.

Figure 7C:
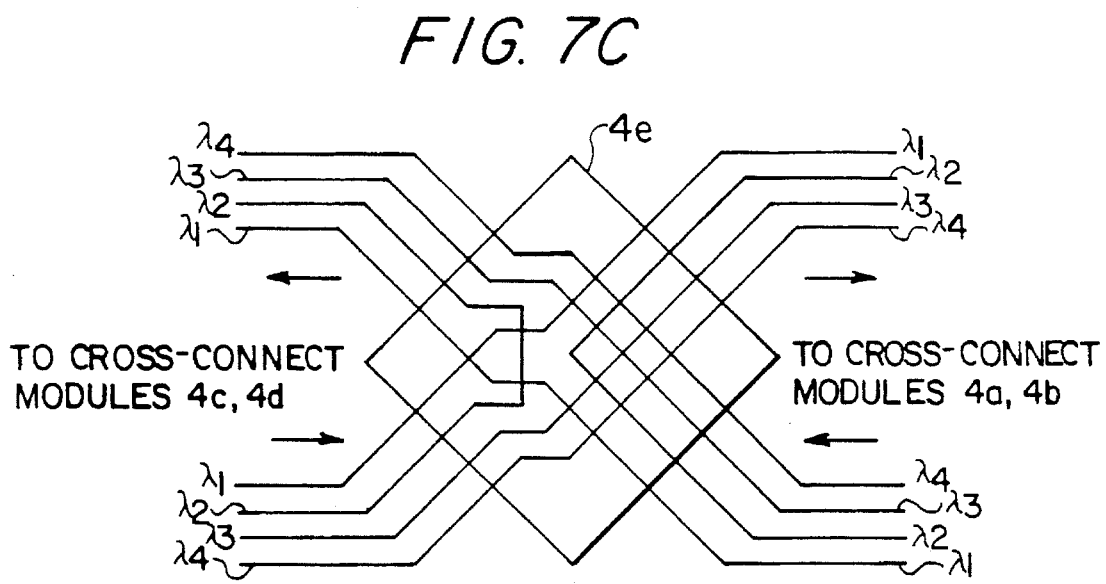

In an alternative configuration, FIG. 6A shows a second example routing table of the wavelength assignments for the optical connections, and FIG. 6B is a second example routing table listing the corresponding wavelength-selection, space-division switch settings for FIG. 6A to control each wavelength transmitted through the 2×2 WDM cross-connect modules 4a–4d. FIGS. 7A–7C together show the corresponding graphical representation of FIGS. 6A and 6B. In this second example, FIG. 7A shows the cross-connections through cross-connect modules 4a and 4b, while FIG. 7C shows the cross-connections through cross-connect modules 4c and 4d. FIG. 7B shows the cross-connections through cross-connect module 4e that connect the optical fiber rings 3a, 3b. In contrast to the first example, the connection between access nodes 2a and 2c, and the connection between access nodes 2b and 2d are configured to be direct, single-hop connections. These connections are examples of the longest optical path connections in a network (See Rule No. 2).

As a result of the above configuration, there is no multi-hop local train information carrier connected to all the access nodes defined in the system. Rather, a connection between access nodes 2a and 2d will require a multi-hop connection, possibly using more than one wavelength signal. For example, data signals from access node 2a are transmitted as input signal $\lambda_4$ to access node 2c. From access node 2c, the data signals are translated into input signal $\lambda_2$ for transmission to access node 2d. Within access node 2c, the input signal $\lambda_4$ is translated into $\lambda_2$ through the operation of the ATM switch circuit in the access node, as will be further explained later.

FIGS. 4A, 4b, 6A and 6B incorporate heuristic principles of connection graph theory, where the number of users in the network can be increased, while the channel connectivity and average bandwidth throughput per user for the already existing users is maintained. Thus, as noted earlier, additional look-up tables are built in order to meet user demand in varying traffic patterns and when new users or services are added.

In addition to the predetermined routing rules, the routing tables are based on the number of users and access nodes connected to the network, and the type of available equipment used in the network. A physical layer network controller is incorporated into the network to monitor and control the configurations of the WDM cross-connect modules 4a–4e according to the preselected routing tables. The network controller distributes corresponding commands for executing the network configuration to local node controllers. The local node controller for a given WDM cross-connect module may be, for example, a user station dedicated to performing that function for that WDM cross-connect module. The local node controllers can notify the network controller of any changes in the system requirements and equipment. As changes occur and are communicated to the network controller, the WDM cross-connect modules are reconfigured accordingly to accommodate the changes.

Figure 9:
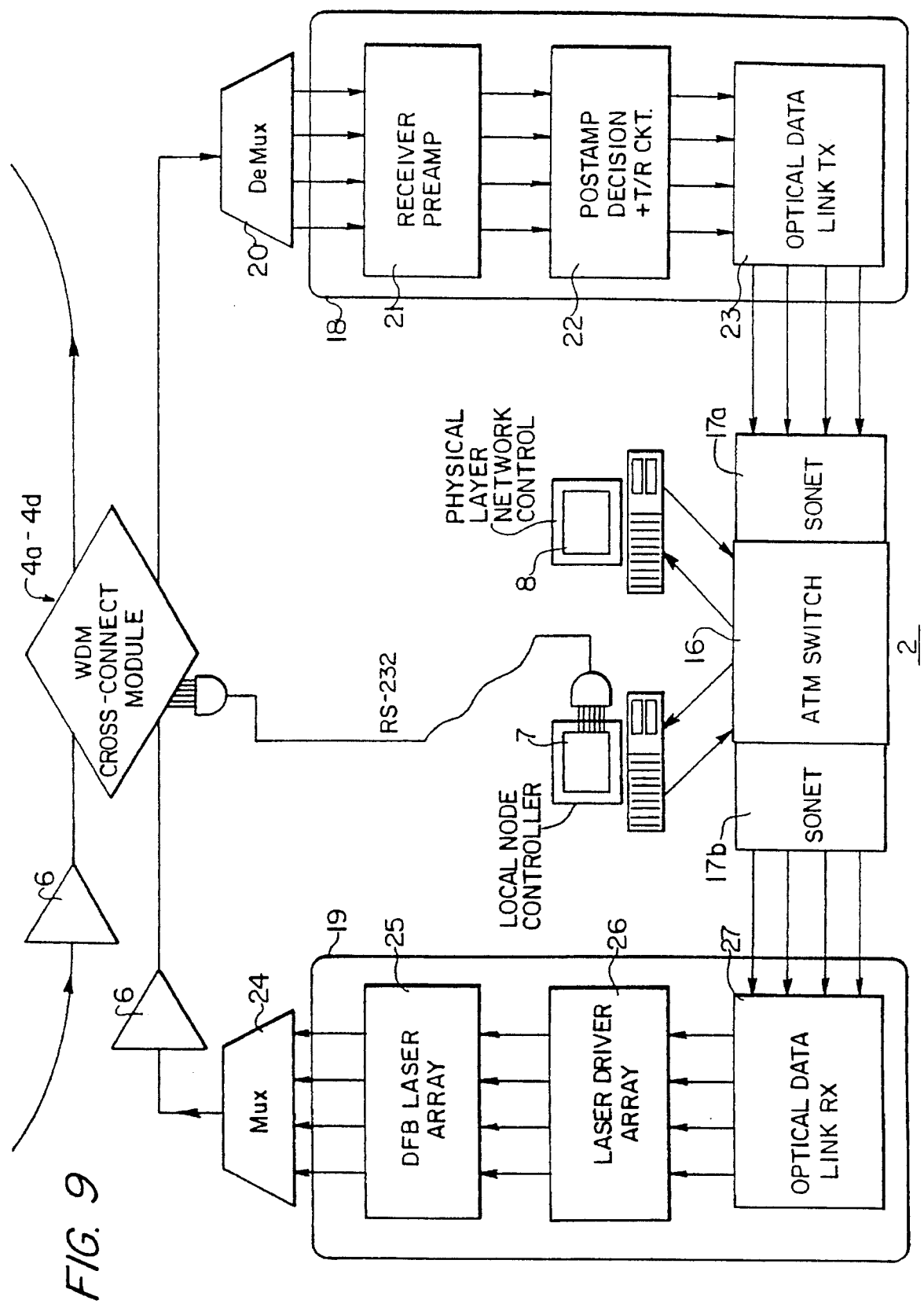
FIG. 9 is a system block diagram of an access node structure that is incorporated into the network architecture of the present invention shown in FIG. 1.

In the preferred embodiment of the invention, a network controller 8 as shown in FIGS. 1 and 9 monitors not only the cross-configurations according to the above-discussed predetermined routing rules applied in the preselected routing tables, but also the requirements communicated by local node controllers 7. Based on data signals from the local node controllers 7, the network controller 8 configures the network, and distributes corresponding commands back to the local node controllers 7.

In the embodiment shown in FIG. 1, the network controller 8 and the local node controllers 7, are selected workstations or user stations on the network. In this case, user station 5h is the network controller 8, and user station 5g is one example of a local node controller 7 for the access node 2d and correspondingly, the WDM cross-connect module 4d. Each of the remaining access nodes 2a–2c also has one user station designated as the local node controller. For the WDM cross-connect module 4e, another user station connected to any of the access nodes 2a–2d may be designated as its local node controller.

In every data signal transmitted through the network, a small bandwidth is reserved for communication between the network controller 8 and the local node controllers 7. This allows the network controller 8, as well as the local node controllers 7 to continuously monitor the various elements of the network.

In operation, the network controller 8 distributes a data file containing the reconfiguration data to all the local node controllers 7. The local node controllers 7 in turn implement the reconfiguration data at a pre-assigned time. Each of the local node controllers 7 then controls a corresponding WDM cross-connect module 4a–4e.

In this embodiment of the invention, the WDM cross-connect modules are connected to the node controller 7 through an RS-232 serial data port 26 as shown in FIG. 9. However, other types of data bus devices or systems may be used in order to optimize the communication between the WDM cross-connect modules and their corresponding local node controllers. For example, instead of an RS-232 bus, the local node controllers 7 can each be connected to their corresponding WDM cross-connect modules through an IEEE 488 bus or even an optical databus for longer distance control or faster communication. This is especially applicable to any WDM cross-connect module which may be physically located remotely from its local node controller. For example, the WDM cross-connect module 4e that connects two adjacent optical fiber rings 3 together most likely will be physically located a considerable distance away from its local node controller 7. In this case, an RS-232 data bus would not be able to provide an effective communication link between them.

Figure 8:
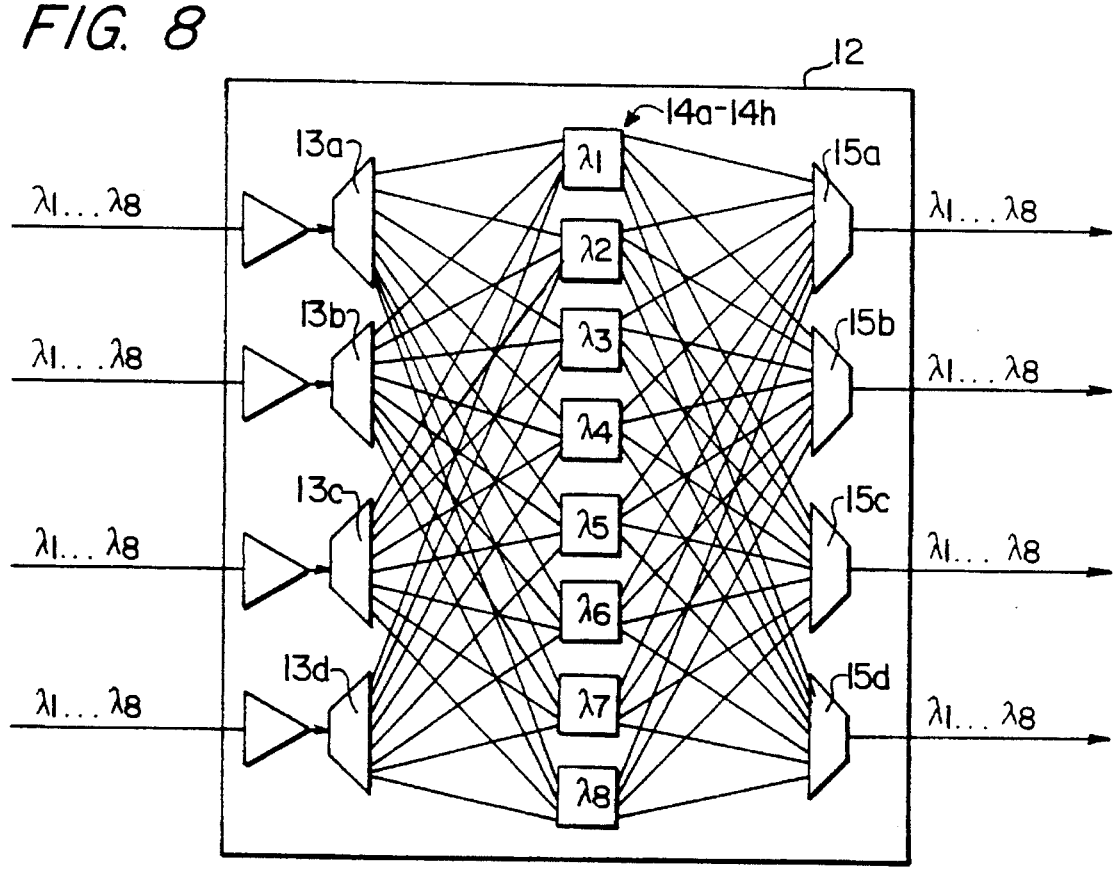
FIG. 8 is a system diagram for a 4×4 WDM cross-connect module applicable to the network architecture of the present invention.

FIG. 8 illustrates a third embodiment of the present invention comprising a 4×4 WDM cross-connect module 12. As shown, four parallel multiplexed data streams are inputted into demultiplexers 13a–13d. Input signals $\lambda_1-\lambda_s$ in each of the four data streams are demultiplexed and routed to their corresponding wavelength-selection, space-division switches 14a–14h. Within the wavelength-selection, space-division switches 14a–14h, like the wavelength-selection, space-division switches 10a–10d, the input signals are either routed through to one of the corresponding multiplexers 15a–15d directly or diverted to an access node connected to the WDM cross-connect module 12. Multiplexers 15a–15d then multiplex their corresponding output signals $\lambda'_1-\lambda'_s$ for further transmission in the system.

In the above-described application of the invention in an optical network, the WDM cross-connect modules 4a–4e may be formed with hybrid, fiber-optic based structures in order to achieve high channel isolation, wide flat passbands, and low loss.

As discussed earlier, the optical fiber amplifiers 6 are employed to compensate for component insertion losses, as well as fiber transmission losses. In the above-described embodiments, these optical fiber amplifiers 6 are uni-directional allowing signal transmissions in only one direction along the optical fiber rings 3a, 3b. By replacing the uni-directional optical fiber amplifiers with bi-directional amplifiers, signal transmissions can be sent from the access nodes 2a–2d in both directions along the optical fiber rings 3a, 3b. Alternatively, the optical fiber amplifiers 6 can be positioned in pairs and modified to operate bi-directionally. With the optical fiber amplifiers 6 operating bi-directionally, data signals at the various wavelengths may be sent in opposite directions from the access nodes 2a–2d.

As a result, the bandwidth in the network may be used more efficiently, to increase the number of single-hop connections. Further, the bi-directional transmission of data signals may significantly reduce interchannel crosstalk by effectively increasing the channel spacing in each direction of data transmission.

Figure 10A:
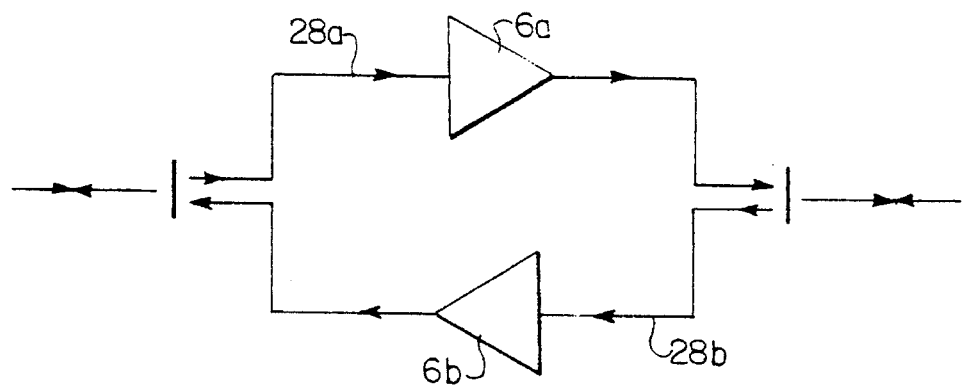
FIGS. 10A and 10B show examples of optical amplifier circuits used for bi-directional transmission of data signals.

FIG. 10A shows an example of a pair of erbium-doped fiber amplifiers 6a and 6b connected to operate bi-directionally. The amplifiers 6a, 6b are positioned in opposite directions and are connected to the optical fiber rings 3a, 3b through two 1×2 optical circulators 28a, 28b, for example, JDS/FITEL optical circulators. Specifically, the optical circulator 28a is connected to relay data signals inputted into the amplifier 6a and data signals outputted by the amplifier 6b. The optical circulator 28b relays data signals inputted into the amplifier 6b and data signals outputted by the amplifier 6a. The 1×2 optical circulators selected for this structure have a typical insertion loss of about 1 dB and a back reflectivity less than −55 dB.

Figure 10B:
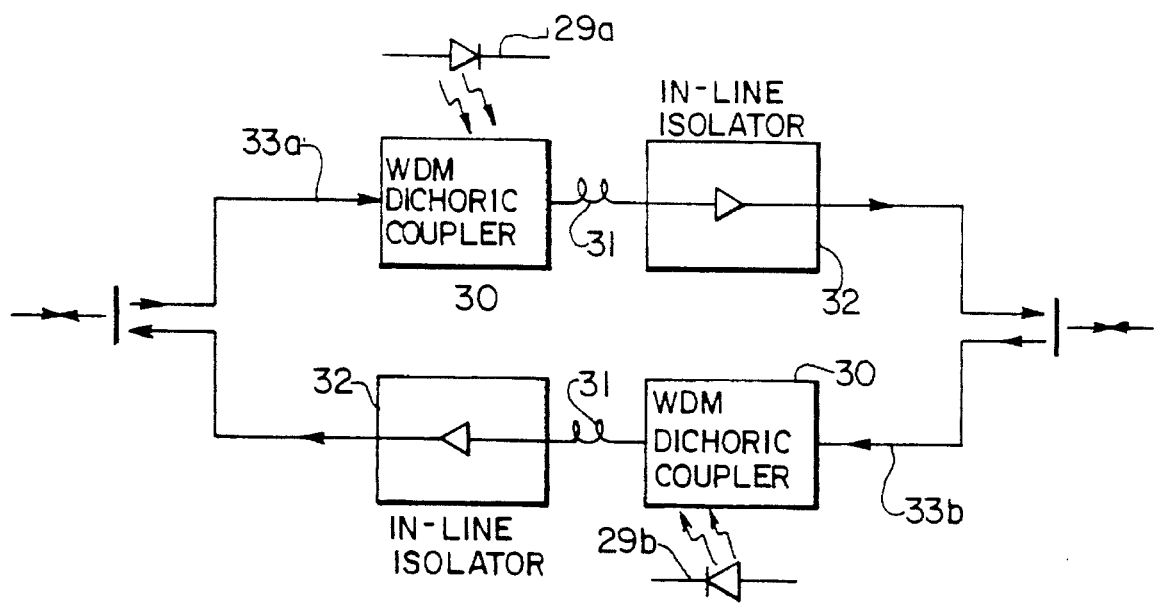

FIG. 10B shows the circuit diagram for one example of a bi-directional optical amplifier 6'. The circuit for the amplifier 6' consists of two amplifier sub-elements 29a, 29b connected in parallel and in opposite directions. Each sub-element 29a, 29b incorporates a WDM dichoric coupler 30, erbium-doped fibers 31 and an in-line isolator 32 connected in series. The sub-elements 29a, 29b are then connected to the optical fiber rings 3a, 3b through 1×2 couplers 33a, 33b. The coupler 33a is connected to relay data signals inputted into the sub-element 29a and data signals outputted by the sub-element 29b, while the coupler 33b relays data signals inputted into the sub-element 29b and data signals outputted by the sub-element 29a. The WDM dichoric coupler 30 amplifies the data signals inputted into the sub-element using a pump laser diode 34 as a laser light power supply. The in-line isolator 32 allows the data signals to travel in one direction through the sub-element, and prevents the data signals from travelling in the opposite direction. Data signals travelling through an optical isolator typically experience a 1 dB loss in the direction of travel, and a 30–40 dB loss in the opposite direction.

The structure of one embodiment of an access node is illustrated in FIG. 9. As shown, each of the access nodes 2a–2d includes an asynchronous transfer mode (ATM) switch circuit 16 connected via conventional Synchronous Optical NEtwork Transport (SONET) interfaces 17a, 17b to a receiver array 18 and a transmitter array 19, respectively. The SONET interfaces 17a, 17b are international standard optical communication devices and are well known in the art.

The receiver array 18 is connected to an input side of the ATM switch circuit 16 via the SONET interface 17a, and has a demultiplexer 20 for demultiplexing input data signals, a receiver preamplifier circuit 21, a postamplifier decision and timing recovery circuit 22, and an optical link 23 for converting the input data signals into input signals for transmission to the ATM switch circuit 16. The receiver preamplifier circuit 21 first amplifies and recovers the parallel input data signals that are demultiplexed out of the WDM cross-connect module. After amplification and signal recovery, the postamplifier decision and timing recovery circuit 22 conducts signal level and timing recovery of the input data signals for the internal operation of the receiver array 18.

Since the input data signals are optical signals, the signal time lengths and signal strengths of the input data signals do not necessarily correspond to the precise signal time lengths and signal strengths that conventional electronic signals require. However, since those signals are now being processed through the electronic circuitry of receiver array 18, the input data signals must be translated into electronic signals. As such, the optical input data signals after being demultiplexed are interpreted and then converted into conventional digital electronic signals based on their signal strengths and timing. In other words, the postamplifier decision and timing recovery circuit 22 translates the optical signals into electronic signals by logically determining the electronic equivalent of the optical signals. For example, optical signals having specific minimums or minimum ranges of signal strength are ON or "high" signals, and those with specific maximums or maximum ranges are OFF or "low" signals. In addition, specified time lengths and frequencies of the optical signals are translated into corresponding electronic signal time periods and frequencies.

After the postamplifier decision circuit 22, the converted input data signals are converted back into optical signals and outputted through the optical link 23 to the ATM switch circuit 16. In another embodiment, if the ATM switch circuit includes a STS-3 interface module, then the output of the postamplifier decision circuit 22 can instead be connected directly to the ATM switch circuit 16 without the need for the optical data link 23.

The ATM switch circuit 16 receives the input data signals through the SONET interface 17a. In this embodiment of the access node, the ATM switch is a FORE Systems ASX100 16×16 switch with a 2.5 Gb/sec total throughput.

With the input data signals from the SONET interface 17a, the ATM switch circuit 16 can then transmit the input data signals to their respective destinations (e.g., user interfaces 5a–5h which may be connected to that particular ATM switch circuit 16), or even pass the input data signals back through the network. The ATM switch circuit 16 manages the transmission of the input data signals from the SONET interface 17a, for example, by reading the identification bits or header in each packet of data in the input data signals. The example of when input data signals are passed back into the network is when those signals are being transmitted to an access node that can only be reached through a multi-hop connection, as explained earlier.

The transmitter array 19 is connected to an output side of the ATM switch circuit 16 through the SONET interface 17b and has a multiplexer 24 for multiplexing output data signals, a laser array 25 connected to the multiplexer 24 for generating the output data signals to be multiplexed, a laser driver array 26 to drive the laser array 25 and generate the output data signals, and an optical link 27 for inputting output data signals from the ATM switch circuit 16 to the laser driver array 26.

From among the user interfaces 5a–5h which may be connected to the ATM switch circuit 16, output data signals are transmitted to the ATM switch circuit 16 which are then converted into optical signals through the SONET interface 17b. The optical output data signals are then transmitted to the optical link 27 which inputs those signals into the laser driver array 26. The laser driver array 26 then uses the laser array 25 to generate the output data signals to be sent through the access node. The multiplexer 24 then multiplexes the parallel output data signals together for transmission through the access node. After the output data signals are multiplexed, an optical fiber amplifier 6 may be incorporated to amplify the signal outputted from the access node to the WDM cross-connect module.

One example of a structure for the laser array 26 is a ridge waveguide with compressive-strained quantum-well distributed feedback (DFB) lasers made from InGaAsP quaternary material systems. DFB laser arrays operating with fixed wavelength channels may be used because of their precise channel-spacing control and their relatively low packaging and maintenance costs. Each laser array 26 in the system has eight lasers on a single substrate (for example, made from InP) with two lasers dedicated to each wavelength to provide redundancy and chip yield improvement. The typical threshold current for this structure has been determined to be 26 mA and the wavelength spacing to be 4.0±0.4 nm. The absolute wavelengths can be tuned by the combination of the substrate temperature and individual bias currents of the lasers. In this example, two such laser arrays can be structured with fiber pigtail arrays and conical lenses that have been determined to have coupling efficiencies of better than −11 dB.

Both the receiver array 18 with its demultiplexer 20, receiver preamplifier circuit 21, postamplifier decision and timing recovery circuit 22 and optical link 23, along with the transmitter array 19 with its multiplexer 24, laser driver array 26, and optical link 27 can be formed into integrated circuits using GaAs/AlGaAs heterojunction bipolar transistors, such as those used by Rockwell International in its implementation of the receiver and transmitter arrays. However, other IC technologies such as silicon bipolar and GaAs MESFET devices can be used.

Modifications and variations of the above-described embodiments of the present invention are possible, as appreciated by those skilled in the art in light of the above teachings. For example, the WDM cross-connect modules can incorporate tapping ports for collecting the reflected, un-used energies from each wavelength channel to prevent the accumulation of inter-channel leakages. Also, the tapping port can include a spectral analyzer to analyze the energies collected in the tapping port. Such an analysis can provide information on the wavelength channels at each wavelength-selection, space-division switch in a WDM cross-connect module. Such information can then be used to control the operation of the access node that corresponds to the WDM cross-connect module.

It is therefore to be understood that, within the scope of the appended claims and their equivalents, the invention may be practiced otherwise than as specifically described.

What is claimed is:

1. An optical communication network system, comprising:
   a plurality of optical cross-connecting switch devices each controlling a routing of optical data signals in the optical communications network system;
   a plurality of fiber optic communication network rings through which data signals are transmitted and received, each of said rings being connected to at least one other ring with at least one of said plurality of optical cross-connecting switch devices such that the data signals can be transmitted and received between adjacent network rings;
   a plurality of access node circuits connected to at least one of said plurality of network rings with one of said plurality of optical cross-connecting switch devices, each of said access node circuits being connected to access the data signals being transmitted and received through said network rings;
   at least one user station connected to each of said plurality of access node circuits; and
   at least one network controller controlling said plurality of cross-connecting switch devices and having means for configuring each of said plurality of cross-connecting switch devices to control the routing of the data signals;
   wherein each of said plurality of access node circuits has a local node controller connected to said at least one network controller, whereby said at least one network controller controls configurations of said plurality of access node circuits and said plurality of cross-connecting switch devices through corresponding local node controllers.

2. An optical communication network system as claimed in claim 2, wherein each of said plurality of optical cross-connecting switch devices includes:
   a demultiplexer circuit for demultiplexing the data signals transmitted through the network into a plurality of wavelength-separated data signals,
   a plurality of wavelength-selection, space-division switches each configured to receive a corresponding one of said wavelength-separated data signals, each wavelength-selection, space-division switch being configured to one of a BAR state to bypass a corresponding wavelength-separated data signal through the wavelength-selection, space-division switch, and a CROSS state to transmit a corresponding wavelength-separated data signal to a corresponding access node circuit and to receive a corresponding wavelength-separated data signal from the corresponding access node circuit, and
   a multiplexer circuit for multiplexing the plurality of wavelength-separated data signals into the data signals transmitted through the network.

3. An optical communication network system as claimed in claim 2, further comprising:
   a plurality of optical fiber amplifiers connected in series within each of said network rings.

4. An optical communication network system as claimed in claim 2, wherein each of said plurality of access node circuits further includes an asynchronous transfer mode (ATM) circuit, a receiver array and a transmitter array,
   the receiver array being connected to an input side of the ATM circuit and having a demultiplexer for demultiplexing input data signals, a receiver amplifier circuit for amplifying the demultiplexed input data signals, and an optical link for transmitting the input data signals to the ATM circuit,
   the transmitter array being connected to an output side of the ATM circuit and having a multiplexer for multiplexing output data signals to be outputted, an output signal array connected to the multiplexer for generating the output data signals to be multiplexed, a laser driver array for driving the output signal array to generate the output data signals, and an optical link for coverting output signals from the ATM circuit to be transmitted to the laser driver array, and
   a corresponding local node controller connected to the ATM circuit.

5. An optical communication network system, comprising:
   a plurality of optical cross-connecting switch devices each controlling a routing of optical data signals in the optical communications network system;
   a plurality of fiber optic communication network rings through which data signals are transmitted and received, each of said rings being connected to at least one other ring with at least one of said plurality of optical cross-connecting switch devices such that the data signals can be transmitted and received between adjacent network rings;
   a plurality of access node circuits connected to at least one of said plurality of network rings with one of said plurality of optical cross-connecting switch devices, each of said access node circuits being connected to access the data signals being transmitted and received through said network rings;
   at least one user station connected to each of said plurality of access node circuits; and
   at least one network controller controlling said plurality of cross-connecting switch devices and having means for configuring each of said plurality of cross-connecting switch devices to control the routing of the data signals;
   wherein each of said plurality of cross-connecting switch devices includes:
   a demultiplexer circuit for demultiplexing the data signals transmitted through the network into a plurality of wavelength-separated data signals,
   a plurality of wavelength-selection, space-division switches each configured to receive a corresponding one of said wavelength-separated data signals, each wavelength-selection, space-division switch being configured to at least one of a BAR state to bypass a corresponding wavelength-separated data signal through the wavelength selection, space-division switch, and a CROSS state to transmit a corresponding wavelength-separated data signal to a corresponding access node circuit and to receive a corresponding wavelength-separated data signal from the corresponding access node circuit, and a multiplexer circuit for multiplexing the plurality of wavelength-separated data signals into the data signals transmitted through the network.

6. An optical communication network system as claimed in claim 5, further comprising a plurality of optical fiber amplifiers connected in series within each of said network rings.

7. An optical communication network system as claimed in claim 5, wherein each of said plurality of access node circuits further includes an asynchronous transfer mode (ATM) circuit, a receiver array and a transmitter array, the receiver array being connected to an input side of the ATM circuit and having a demultiplexer for demultiplexing input data signals, a receiver amplifier circuit for amplifying the demultiplexed input data signals, and an optical link for converting the input data signals into input signals for transmission to the ATM circuit, and the transmitter array being connected to an output side of the ATM circuit and having a multiplexer for multiplexing output data signals to be outputted, a laser array connected to the multiplexer for generating the output data signals to be multiplexed, a laser driver array for driving the laser array to generate the output data signals, and an optical link for converting output signals from the ATM circuit to be transmitted to the laser driver array, wherein corresponding ones of said plurality of user stations are connected to the ATM circuit in order to access said network rings through a corresponding access node circuit, and a corresponding local node controller is connected to the ATM circuit.

8. An optical communication network system, comprising:

a plurality of optical cross-connecting switch devices each controlling a routing of optical data signals in the optical communications network system;

a plurality of fiber optic communication network rings through which data signals are transmitted and received, each of said rings being connected to at least one other ring with at least one of said plurality of optical cross-connecting switch devices such that the data signals can be transmitted and received between adjacent network rings;

a plurality of access node circuits connected to at least one of said plurality of network rings with one of said plurality of optical cross-connecting switch devices, each of said access node circuits being connected to access the data signals being transmitted and received through said network rings;

at least one user station connected to each of said plurality of access node circuits; and at least one network controller controlling said plurality of cross-connecting switch devices and having means for configuring each of said plurality of cross-connecting switch devices to control the routing of the data signals; and a plurality of optical fiber amplifiers connected in series within each of said network rings.

9. An optical communication network system as claimed in claim 8, wherein each of said plurality of access node circuits further includes an asynchronous transfer mode (ATM) circuit, a receiver array and a transmitter array, the receiver array being connected to an input side of the ATM circuit and having a demultiplexer for demultiplexing input data signals, a receiver amplifier circuit for amplifying the demultiplexed input data signals, and an optical link for converting the input data signals into input signals for transmission to the ATM circuit, and the transmitter array being connected to an output side of the ATM circuit and having a multiplexer for multiplexing output data signals to be outputted, a laser array connected to the multiplexer for generating the output data signals to be multiplexed, a laser driver array for driving the laser array to generate the output data signals, and an optical link for converting output signals from the ATM circuit to be transmitted to the laser driver array, wherein corresponding ones of said plurality of user stations are connected to the ATM circuit in order to access said network rings through a corresponding access node circuit, and a corresponding local node controller is connected to the ATM circuit.

10. An optical communication network system, comprising:

a plurality of optical cross-connecting switch devices each controlling a routing of optical data signals in the optical communications network system;

a plurality of fiber optic communication network rings through which data signals are transmitted and received, each of said rings being connected to at least one other ring with at least one of said plurality of optical cross-connecting switch devices such that the data signals can be transmitted and received between adjacent network rings;

a plurality of access node circuits connected to at least one of said plurality of network rings with one of said plurality of optical cross-connecting switch devices, each of said access node circuits being connected to access the data signals being transmitted and received through said network rings;

at least one user station connected to each of said plurality of access node circuits; and at least one network controller controlling said plurality of cross-connecting switch devices and having means for configuring each of said plurality of cross-connecting switch devices to control the routing of the data signals;

wherein each of said plurality of access node circuits further includes an asynchronous transfer mode (ATM) circuit, a receiver array and a transmitter array, the receiver array being connected to an input side of the ATM circuit and having a demultiplexer for demultiplexing input data signals, a receiver amplifier circuit for amplifying the demultiplexed input data signals, and an optical link for converting the input data signals into input signals for transmission to the ATM circuit, and the transmitter array being connected to an output side of the ATM circuit and having a multiplexer for multiplexing output data signals to be outputted, a laser array connected to the multiplexer for generating the output data signals to be multiplexed, a laser driver array for driving the laser array to generate the output data signals, and an optical link for converting output signals from the ATM circuit to be transmitted to the laser driver array, wherein corresponding ones of said plurality of user stations are connected to the ATM circuit in order to access said network rings through a corresponding access node circuit, and a corresponding local node controller is connected to the ATM circuit.

11. A communication network system, comprising:

a plurality of optical wavelength division multiplexing (WDM) switch devices each controlling a routing of data signals in the communication network system, each of said plurality of WDM switch devices having a plurality of wavelength-selection, space-division switches each configured to receive one of a plurality of input data signals wavelength-separated from the data signals transmitted through the network;

a plurality of fiber optic rings through which data signals are transmitted and received, each of said fiber optic rings being connected to at least one other fiber optic ring with at least one of said plurality of optical WDM switch devices such that data signals can be transmitted and received between adjacent fiber optic rings;

a plurality of laser array access node circuits connected to at least one of said plurality of fiber optic rings with one of said plurality of optical WDM switch devices, each of said laser array access node circuits being connected to access the wavelength-separated input data signals from a corresponding WDM switch device, said plurality of optical WDM switch devices being connected between each of said plurality of laser array access node circuits and said fiber optic rings such that an optical WDM switch device controls the routing of the transmission and receiving of data signals between a corresponding fiber optic ring and laser array access node circuit, each of said laser array access node circuits having a plurality of user stations connected thereto; and at least one network controller controlling and configuring said plurality of optical WDM switch devices, said at least one network controller being connected to each of said laser array access node circuits to control corresponding optical WDM switch devices in routing the data signals;

wherein each of said wavelength selection, space-division switches has means for configuring into one of a BAR state to bypass a corresponding wavelength-separated input data signal through the wavelength-selection, space-division switch, and a CROSS state to transmit a corresponding wavelength-separated input data signal to a corresponding laser array access node circuit and to receive a corresponding wavelength-separated input data signal from the corresponding laser array access node circuit.

12. A communication network system as claimed in claim 11, wherein each of said fiber optic rings includes a plurality of optical fiber amplifiers connected in series within each of said fiber optic rings.

13. A communication network system as claimed in claim 11, wherein each of said plurality of laser array access node circuits further includes an asynchronous transfer mode (ATM) circuit, a receiver array and a transmitter output array, the receiver array being connected to an input side of the ATM circuit and having a demultiplexer for demultiplexing input data signals, a receiver amplifier circuit for amplifying the demultiplexed input data signals, and means for transmitting the input data signals to the ATM circuit, and the transmitter array being connected to an output side of the ATM circuit and having a multiplexer for multiplexing output data signals to be outputted, a distributed-feedback (DFB) laser array connected to the multiplexer for generating the output data signals to be multiplexed, a laser driver array for driving the DFB laser array to generate the output data signals, and an optical link for receiving output signals from the ATM circuit to be transmitted to the laser driver array, and wherein at least one of a plurality of user stations are connected to the ATM circuit in order to access said fiber optic rings through a corresponding laser array access node circuit.

14. A communication network system as claimed in claim 13, wherein said means for transmitting the input data signals to the ATM circuit in said receiver array includes an optical link.

15. A communication network system as claimed in claim 13, wherein said means for transmitting the input data signals to the ATM circuit in said receiver array includes an STS-3 interface module connected to said ATM circuit.

16. A high speed data signals communication cross-connecting system for an optical communication network comprising:

a plurality of optical wavelength division multiplexing (WDM) switch devices for controlling a routing of data signals in the optical communication network;

a plurality of fiber optic communication network rings through which data signals is transmitted and received, said network rings being connected to each other with at least one of said plurality of optical WDM switch devices such that data signals can be transmitted and received between said network rings a plurality of access node circuits connected to one of said plurality of fiber optic communication network rings with a corresponding one of said plurality of optical WDM switch devices, whereby a WDM switch controls routing of the transmission and receiving of data signals between corresponding network rings and access node circuits;

a plurality of user stations connected to said network rings through a corresponding one of said plurality of access node circuits in order to access the data signals being transmitted and received through said network rings; and at least one network controller controlling said WDM switch devices and having means for configuring each of said WDM switch devices to control routing of the data signals;

wherein each of said plurality of access node circuits further includes an asynchronous transfer mode (ATM) circuit, a receiver array and a transmitter output array, the receiver array being connected to an input side of the ATM circuit and having a demultiplexer for demultiplexing input data signals, a receiver amplifier circuit for amplifying the demultiplexed input data signals, an optical link for converting the input data signals into input signals for transmission to the ATM circuit, the transmitter array being connected to an output side of the ATM circuit and having a multiplexer for multiplexing output data signals to be outputted, a distributed-feedback (DFB) laser array connected to the multiplexer for generating the output data signals to be multiplexed, a laser driver array for driving the DFB laser array to generate the output data signals, and an optical link for converting output signals from the ATM circuit to be transmitted to the laser driver array, and corresponding ones of the plurality of user stations being connected to the ATM circuit in order to access the network rings through a corresponding access node circuit.

17. A high speed data signals communication cross-connecting system as claimed in claim 14, wherein each of said plurality of WDM switch devices includes:

a demultiplexer circuit for demultiplexing the data signals transmitted through the network into a plurality of wavelength-separated data signals, a plurality of wavelength-selection, space-division switches each configured to receive a corresponding one of said wavelength-separated data signals, each wavelength-selection, space-division switch being configured to at least one of a BAR state to bypass a corresponding wavelength-separated data signal through the wavelength-selection, space-division switch, and a CROSS state to transmit a corresponding wavelength-separated data signal to a corresponding access node circuit and to receive a corresponding wavelength-separated data signal from the corresponding access node circuit, and a multiplexer circuit for multiplexing the plurality of wavelength-separated data signals into the data signals transmitted through the network.

18. A high speed data signals communication cross-connecting system as claimed in claim 16, wherein each of said plurality of access node circuits includes a local node controller connected to said network controller and a corresponding WDM switch device, for controlling the corresponding WDM switch device.

19. A method for communicating data signals between a plurality of communication access nodes in a high-speed optical communication network, the network including a plurality of fiber optic communication network rings connected to each other, and a plurality of optical cross-connecting switch devices each connected between adjacent network rings and between a network ring and an access node circuit, said method comprising the steps of:

configuring each of said cross-connecting switch devices to wavelength demultiplex a plurality of network data signals into input data signals each in a separate wavelength from other input data signals, selectively route said input data signals to a corresponding access node circuit or to bypass the corresponding access node circuit, and multiplex output data signals with bypassing input data signals;

receiving input data signals from a cross-connecting switch device at a corresponding access node circuit based on said configuring of said cross-connecting switch devices;

selectively routing said input data signals to at least one user station connected to said access node circuit or to bypass back to said cross-connecting switch device to be multiplexed; and receiving at said access node circuit output data signals from said at least one user station to be multiplexed by said cross-connecting switch device; and transmitting network data signals to said communication network rings based on the output data signals multiplexed with the bypassing input data signals from said cross-connecting switch device, said network data signals being received by at least one other of said plurality of cross-connect switch devices;

wherein said step of configuring said cross-connecting switch devices includes the steps of providing control data in said network data signals, and routing said control data when demultiplexed through a corresponding access node circuit to a controller of said cross-connecting switch device.

20. A method for communicating data signals as claimed in claim 19, wherein said step of transmitting network data signals to said communication network rings includes the step of said plurality of cross-connecting switch devices transmitting network data signals in one direction within said communication network rings.

21. A method for communicating data signals as claimed in claim 19, wherein said step of transmitting network data signals to said communication network rings includes the step of said plurality of cross-connecting switch devices transmitting network data signals in two directions within said communication network rings.

22. A method for communicating data signals as claimed in claim 19, wherein said step of selectively routing said input data signals includes using asynchronous transfer mode (ATM) switching.

\* \* \* \* \*